United States Patent
Ahn et al.

(10) Patent No.: US 9,417,616 B2
(45) Date of Patent: Aug. 16, 2016

(54) ELECTRIC PRODUCT FOR EFFECTIVELY MANAGING ENERGY SOURCES

(75) Inventors: Junho Ahn, Seoul (KR); Yanghwan Kim, Seoul (KR); Hoonbong Lee, Seoul (KR); Koonseok Lee, Seoul (KR); Seogho Go, Seoul (KR); Jonghee Han, Seoul (KR); Donghyun Kim, Seoul (KR); Woonghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 630 days.

(21) Appl. No.: 13/805,514

(22) PCT Filed: Jun. 22, 2011

(86) PCT No.: PCT/KR2011/004575
§ 371 (c)(1),
(2), (4) Date: May 7, 2013

(87) PCT Pub. No.: WO2011/162553
PCT Pub. Date: Dec. 29, 2011

(65) Prior Publication Data
US 2013/0317662 A1 Nov. 28, 2013

(30) Foreign Application Priority Data

Jun. 22, 2010 (KR) .................. 10-2010-0058920
Jun. 22, 2010 (KR) .................. 10-2010-0059280

(51) Int. Cl.
*H02J 3/14* (2006.01)
*G05B 13/02* (2006.01)
*G06Q 30/00* (2012.01)
(Continued)

(52) U.S. Cl.
CPC ............... *G05B 13/02* (2013.01); *G06Q 30/00* (2013.01); *H02J 3/14* (2013.01); *H02J 13/0079* (2013.01); *H04L 12/10* (2013.01); *H04L 41/0833* (2013.01); *H02J 2003/146* (2013.01); *Y02B 70/3216* (2013.01); *Y04S 20/221* (2013.01); *Y04S 20/224* (2013.01); *Y04S 40/162* (2013.01)

(58) Field of Classification Search
None
See application file for complete search history.

(56) References Cited

U.S. PATENT DOCUMENTS 4,463,249 A * 7/1984 Narita .................... G05D 23/24
219/432
5,059,762 A * 10/1991 Simcock ................. H05B 6/36
219/662

(Continued)

FOREIGN PATENT DOCUMENTS

CN 101053136 A 10/2007
KR 10-2002-0041928 A 6/2002
(Continued)

*Primary Examiner* — Robert Fennema
*Assistant Examiner* — Jay Jung
(74) *Attorney, Agent, or Firm* — Dentons US LLP

(57) ABSTRACT

A network system is provided. The network includes: at least one component selected from an energy receiving unit receiving energy and an energy management unit managing the energy receiving unit. The energy receiving unit or the energy management unit receives energy rate related information; an energy usage amount or a usage rate of when the component is controlled on the basis of at least the energy rate related information is less than that of when the component is controlled without the basis of at least energy rate related information; and if the energy rate related information is high cost information, a function of one component constituting the energy receiving unit is limited and a function of another component constituting the energy receiving unit is performed.

22 Claims, 19 Drawing Sheets

(51) Int. Cl.
*H02J 13/00* (2006.01)
*H04L 12/10* (2006.01)
*H04L 12/24* (2006.01)

(56) References Cited

U.S. PATENT DOCUMENTS

| | | | |
|---|---|---|---|
| 2002/0032491 A1* | 3/2002 | Imamura | D06F 39/005 700/79 |
| 2003/0050737 A1* | 3/2003 | Osann, Jr. | G05B 15/02 700/276 |
| 2003/0171851 A1* | 9/2003 | Brickfield | H02J 3/008 700/286 |
| 2003/0217417 A1* | 11/2003 | Jung | D06F 35/00 8/158 |
| 2005/0108441 A1* | 5/2005 | Wang | G06F 1/3293 710/1 |
| 2005/0125083 A1* | 6/2005 | Kiko | G05B 15/02 700/19 |
| 2006/0266228 A1* | 11/2006 | Ritterling | A47J 37/067 99/450 |
| 2006/0272830 A1* | 12/2006 | Fima | E03B 1/00 169/16 |
| 2007/0028198 A1* | 2/2007 | New | G06F 17/5045 716/105 |
| 2007/0289607 A1* | 12/2007 | Kim | D06F 35/006 134/18 |
| 2008/0039979 A1* | 2/2008 | Bridges | B60L 11/1816 700/292 |
| 2008/106146 A1 | 5/2008 | Baek et al. | |
| 2008/0109867 A1* | 5/2008 | Panabaker | H04W 12/08 726/1 |
| 2008/0122585 A1* | 5/2008 | Castaldo | G06F 9/54 340/286.01 |
| 2008/0167756 A1* | 7/2008 | Golden | G05B 15/02 700/297 |
| 2008/0177678 A1* | 7/2008 | Di Martini | G01D 4/002 705/412 |
| 2008/0178621 A1* | 7/2008 | Kang | F25B 5/04 62/179 |
| 2009/0187499 A1* | 7/2009 | Mulder | G05B 15/02 705/30 |
| 2009/0192657 A1* | 7/2009 | Heicks | F24C 7/082 700/306 |
| 2009/0211111 A1* | 8/2009 | Kim | D06F 58/263 34/526 |
| 2009/0287359 A1* | 11/2009 | Kulyk | H02J 3/14 700/296 |
| 2009/0295594 A1* | 12/2009 | Yoon | G06Q 30/0202 340/6.1 |
| 2009/0299504 A1* | 12/2009 | Kumazawa | G05B 19/4183 700/83 |
| 2010/0090806 A1 | 4/2010 | Schork et al. | |
| 2010/0179704 A1* | 7/2010 | Ozog | G06Q 10/06315 700/291 |
| 2010/0194524 A1* | 8/2010 | Campero | G05B 15/02 340/3.1 |
| 2010/0217550 A1* | 8/2010 | Crabtree | H02J 13/0079 702/62 |
| 2010/0217651 A1* | 8/2010 | Crabtree | G06Q 10/00 705/7.22 |
| 2010/0222935 A1* | 9/2010 | Forbes, Jr. | G06Q 10/00 700/291 |
| 2010/0262313 A1* | 10/2010 | Chambers | G06Q 10/04 700/295 |
| 2010/0318825 A1* | 12/2010 | Fulkerson | G06F 1/3203 713/323 |
| 2011/0015797 A1* | 1/2011 | Gilstrap | G05B 15/02 700/291 |
| 2011/0153090 A1* | 6/2011 | Besore | G05B 15/02 700/278 |
| 2011/0153100 A1* | 6/2011 | Besore | G06Q 10/0631 700/291 |
| 2011/0185511 A1* | 8/2011 | Ryoo | D06F 29/00 8/137 |
| 2011/0251732 A1* | 10/2011 | Schweitzer, III | H02J 3/12 700/297 |

FOREIGN PATENT DOCUMENTS

| | | |
|---|---|---|
| KR | 10-2003-0036286 A | 5/2003 |
| KR | 10-2005-0105673 A | 11/2005 |
| KR | 100701110 B1 | 3/2007 |
| KR | 10-2007-0062006 A | 6/2007 |
| KR | 10-2007-0098172 A | 10/2007 |
| WO | 2010031027 A2 | 3/2010 |

* cited by examiner

Fig. 14
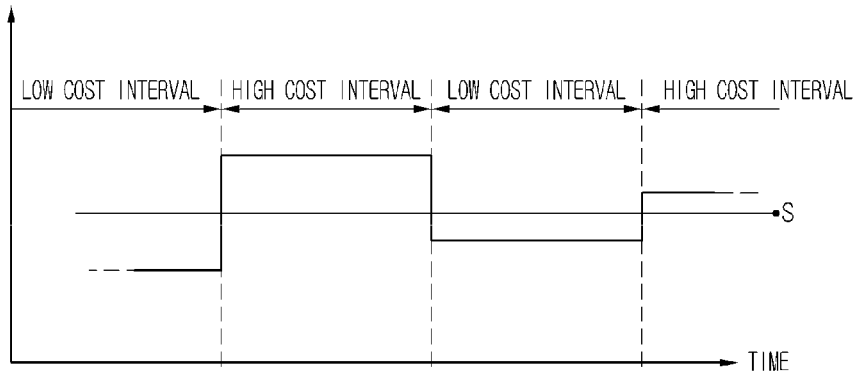
(a)
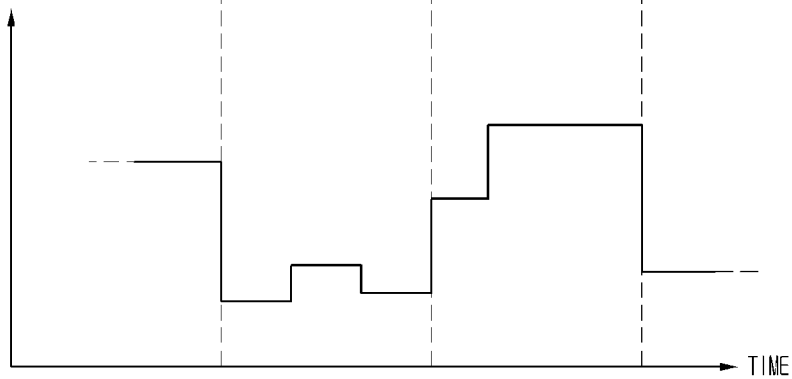
(b)

ELECTRIC PRODUCT FOR EFFECTIVELY MANAGING ENERGY SOURCES

This application claims the benefit of priority of PCT/KR2011/004575 filed on Jun. 22, 2011, which claims priority of Korean Application No. 10-2010-0058920 filed on Jun. 22, 2010, Korean Application No. 10-2010-0059280 filed on Jun. 22, 2010 and PCT/IB/2010/003388 filed on Nov. 26, 2010, all of which are incorporated by reference in their entirety herein.

CROSS-REFERENCE TO RELATED APPLICATIONS

Technical Field

The present disclosure relates to a network system.

BACKGROUND ART

A provider has simply provided energy sources such as electricity, water and gas while a consumer has simply used the supplied energy sources. This makes difficult to realize efficient management in terms of the generation, distribution and use of energy. Therefore, a network system for effectively managing energy is in need.

DISCLOSURE OF THE INVENTION

Technical Problem

Embodiments provide a network system capable of effectively managing energy sources.

Technical Solution

In one embodiment, a network system comprises: at least one component selected from an energy receiving unit receiving energy and an energy management unit managing the energy receiving unit, wherein the energy receiving unit or the energy management unit receives information related to energy rate; an energy usage amount or a usage rate of when the component is controlled on the basis of at least information related to energy rate is less than that of when the component is controlled without the basis of at least information related to energy rate; and if information related to energy rate is high cost information, a function of one component constituting the energy receiving unit is limited and a function of another component constituting the energy receiving unit is performed.

The details of one or more embodiments are set forth in the accompanying drawings and the description below. Other features will be apparent from the description and drawings, and from the claims.

Advantageous Effects

According to embodiments, an energy source can be efficiently produced, used, distributed, and stored, thus enabling the effective management of the energy source.

Also, by using energy information, in-house electric products can be driven and controlled. The energy usage cost and power consumption can be reduced.

BRIEF DESCRIPTION OF THE DRAWINGS

FIG. 14 is a view illustrating power information provided to a component and a power consumption change corresponding thereto according to an embodiment of the present invention.

BEST MODE FOR CARRYING OUT THE INVENTION

Reference will now be made in detail to the embodiments of the present disclosure, examples of which are illustrated in the accompanying drawings.

Reference will now be made in detail to the embodiments of the present disclosure, examples of which are illustrated in the accompanying drawings.

Figure 1:
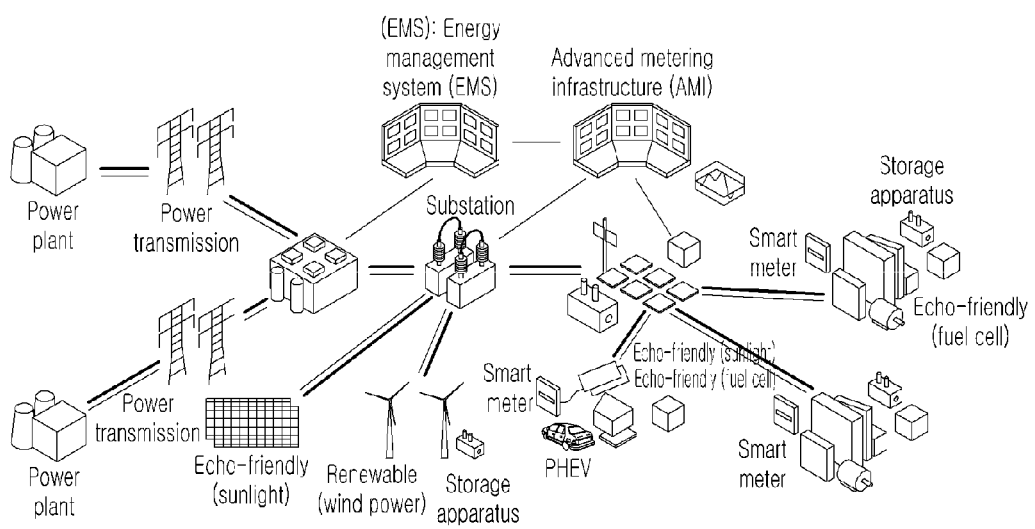
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
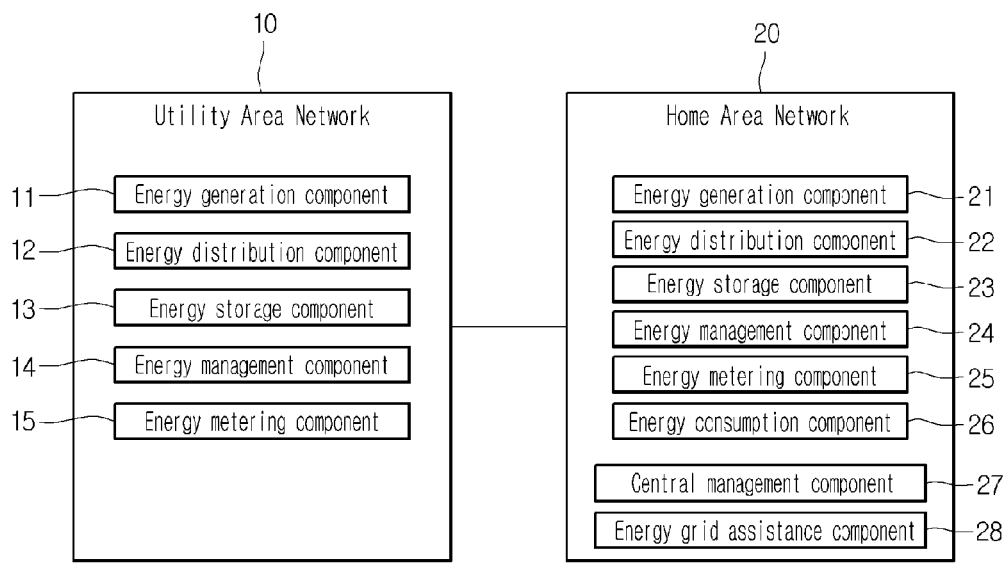
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component 13 for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN 10 may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20.

The energy management component 24 may be provided as a separate configuration or may be included in another component as an energy management function. As an example, the energy management function may be performed by a control component that controls the energy consumption component. In a case where the control component performs the energy management function, it may be an energy management component.

Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component.

The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

The mobile device may receive energy information or additional information (described later), and control the operation of at least the energy consumption component 26 using the received information.

Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component 26 and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20.

The component with a specific function, which constitutes the UAN and the HAN, may be configured as a plurality of components. For example, the energy generation component, the energy consumption component or the like may be configured as a plurality of components.

In this specification, each of the components that constitute the UAN and HAN may having a function performing component that performs its own function, or each of the components itself may be a function performing component.

As an example, in a case where the energy consumption component is an electric product, the electric product has a function performing component such as a heater, compressor, motor or display. As another example, in a case where the energy consumption component is a heater, compressor, motor, display or the like, the energy consumption component itself is a function performing component.

Figure 3:
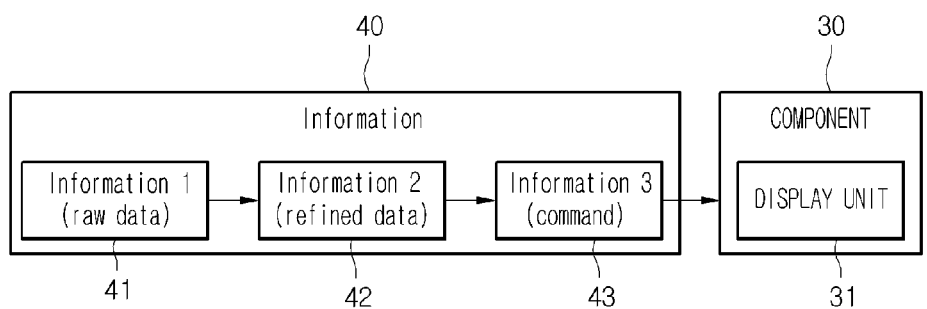
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component 30 recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component 30 recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component 23 is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity generated by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or 23 may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Boolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

Meanwhile, the specific component 30 may include a display unit 31 for displaying information. In this embodiment, the term "information display" means that visual, auditory, olfactory and tactile information is known to the outside. The display unit 31 may include a touch screen for selecting or inputting information. Alternatively, the specific component 30 may include a separate input unit for inputting information by cable or radio.

All the information (energy information or additional information except the energy information) described above may be displayed in the display unit 31. One of the energy information and additional information may be displayed, or two or more pieces of information may be simultaneously displayed. That is, two or more pieces of information may be simultaneously displayed in the display unit 31. As an example, in a case where two or more pieces of information are simultaneously displayed, any one of the information is selected. Then, the selected screen may be enlarged, and the unselected screen may reduced. As another example, if any one of the two or more pieces of information is selected, the selected screen may be enlarged, and the unselected screen may disappear. In a case where specific information is selected and the selected screen is enlarged, information more specific that the previous information or information different from the previous information may be displayed on the enlarged screen. For example, in a case where the selected information is a character, graphic information may be displayed on the enlarged screen, or two or more pieces of information may be sequentially displayed on the enlarged screen. In a case where two or more pieces of information are displayed in the display unit 31, two or more relative positions may be varied.

Information except energy cost information and energy cost may be displayed in the display unit 31. The energy cost information may include current cost, past cost or estimated cost in the future. The energy cost information may include not only information on cost information in a specific period or time but also information on cost used with respect to the operation of a component, cost used in the present, cost to be used (estimation cost), or the like.

The information except the energy cost information may include information on energy reduction, emergency situation, grid safety, power generation quantity, operation priority, energy consumption, energy supply amount, information (e.g., cost change rate, average cost, level or the like) newly generated based on two or more pieces of information (one or more pieces of energy cost information and/or information except the one or more pieces of energy cost information), and the like. In this instance, the energy consumption may be energy consumption used two or more HANs, and may be simultaneously or selectively displayed.

The information on energy consumption may include information on past consumption, current consumption and estimated consumption in the future. The information on energy consumption may include information on accumulated consumption for a specific period (time), average consumption, increasing rate of consumption, decreasing rate of consumption, maximum consumption, minimum consumption, and the like.

The additional information may include one or more of environment information, time information, information related to the one or more components, information related to another component and information related to a user using the one or more components. The environment information may include one or more of information related to carbon dioxide emission rate, concentration of carbon dioxide in air, temperature, humidity, precipitation, presence of rainfall, amount of solar radiation, amount of wind.

In addition to the information described above, information refined based on at least one information or newly generated information may also be displayed in the display unit 31.

In a case where the specific component 30 is the energy storage component 13 or 23, the presence of use of the stored electricity, the remaining amount of the store electricity and the like may be displayed. If the remaining amount of the stored electricity is less than a predetermined value, alarm information may be displayed.

The information displayed in the display unit 31 may include one or more of information on number, character, sentence, figure, shape, symbol, image and light. The information displayed in the display unit 31 may include one or more of information on graph for each time or period, level, table. One or more of the shape, color, brightness, size, position, alarm period, alarm time of the information displayed in the display unit 31 may be varied.

A currently operable function (or menu) may be displayed in the display unit 31. Alternatively, among a plurality of functions, operable and inoperable function may be divided by size, color, position and the like, and then displayed in the display unit 31. Alternatively, in a case where separate input units are provided, only an input units for selecting an operable function may be activated, or an input unit for selecting an operable function and an input unit for selecting an inoperable function may be displayed in different colors.

The target or display method of information displayed in the display unit 31 may be set and changed by a user, or may be changed automatically.

In a case where a condition for informing the user of information is satisfied, specific information may be displayed in the display unit 31. It will be apparent that a portion of a plurality pieces of information may be continuously displayed in the state that a component is turned on. The display time of the information may be changed or set automatically or manually.

If specific information (one or more pieces of information) is selected using the input unit, the selected information may be displayed. If a user contacts a portion of a component, e.g., an input unit, a handle, a display or the like, regardless of information display selection, or operates one or more buttons or knobs that constitute the input unit, a portion of the information may be displayed. In this instance, the information to be displayed may be set or changed. It will be apparent that a sensing unit for sensing a user's contact may be provided to the component. Alternatively, the specific information may be displayed by installation environment or variation of outdoor environment. Alternatively, the specific information may be displayed when the specific component receives new information. Alternatively, the specific information may be displayed when the kind or state of the specific component is changed. As an example, if a light emitting unit is turned off in an off-peak section and an on-peak section comes, the light emitting unit may be turned on. Alternatively, the specific information may be automatically displayed when the operation or state of the component is changed. As an example, in a case where the mode of the component is changed, information related to the changed mode may be automatically displayed.

Meanwhile, the display unit 31 may be separably connected or fixed to the component 30. In a case where the display unit 31 is separable from the component 30, it may perform wired or wireless communication with the component 30 (or control unit of the component). In a case where the display unit 31 is fixed to the component 30, it may also perform wired or wireless communication with the component 30.

In a case where the display unit 31 is separable from the component 30, a communication unit and an input unit for inputting or selecting information may be provided to the display unit 31. Thus, information can be inputted or selected through the input unit in the state that the display unit 31 is separated from the component 30. The communication unit may be provided to the component 30, and only the display unit 31 may be separated from the component 30. The display unit 31 may be the energy management component 24, the energy metering component 25 or the central management component 27, or may be a separate control apparatus.

In a case where the display unit 31 is provided with a communication unit, a communication unit may also provided to the component 30. In a case where the display unit 31 and the component 30 are in the state that they are communicated with each other and information is transmitted/receive through a communication signal, the display unit 31 may be used. That is, in a case where the intensity of a signal is secured so that information can be included in the communication signal, the display unit 31 may be in an available state. On the other hand, in a case where the display unit 31 is not communicated with the component 30 or information is not included in the communication signal due to the weak intensity of the signal, the display unit may be in an unavailable state. One of the display unit 31 and the component 30 transmits a communication signal, and the other of the display unit 31 and the component 30 transmits a response signal. The presence of use of the display unit 31 may be determined by the presence of reception of the communication and response signals and the signal intensity. That is, in a case where any one of the display unit 31 and the component 30 does not receive a signal or the intensity of received signal is less than a reference intensity, it may be determined that the display unit 31 is unavailable. Any one of the display unit 31 and the component 30 may increase the intensity of a transmission signal until it receives a response signal of which intensity is more than the reference intensity.

Information for informing the user of the presence of use of the display unit 31 may be displayed in the display unit 31 or the component 30. If it is recognized that the display unit 31 is unavailable, the component 30 may be controlled to increase its unique performance, to perform a door locking function or to limit its operation. Alternatively, the power of the component may be off while maintaining the power of a communication apparatus (modem) required to perform communication in the network system. Alternatively, the power of the component may be off while maintaining only a memory function for storing the state information of the component.

Meanwhile, sensors may be provided to the respective display unit 31 and component 30 so as to sense the presence of mounting of the display unit 31. As an example, the presence of mounting of the display unit 31 may be determined when the component 30 is operated. Each of the sensors may be a vibration sensor for sensing vibration. If the display unit 31 is mounted on the component 30, vibration generated in the operation of the component 30 can be transferred to the display unit 31. Therefore, in a case where the difference between the values of vibrations respectively sensed by the sensors is less than a predetermined value, it may be recognized that the display unit 31 is mounted on the component 30. If it is recognized that the display unit 31 is mounted on the component 30, the operation of the component 30 may be controlled so that vibration or noise generated in the operation of the component 30 is decreased. As an example, in a case where the component 30 is a washing machine or drier, the rotation speed of a motor may be decreased. In a case where the component 30 is a refrigerator, the driving period of a compressor may be decreased. On the contrary, if it is recognized that the display unit 31 is separated from the component 30, the component may be controlled to increase its unique performance, to perform a door locking function or to limit its operation.

As another example, each of the sensor may be a temperature sensor. In a case where the difference between the values of temperatures respectively sensed by the sensors is less than a predetermined value, it may be recognized that the display unit 31 is mounted on the component 30.

In the state that the display unit 31 is separated from the component 30, an auxiliary display unit may be provided to the component 30 so as to enable the operation of the component 30. The presence of operation of the auxiliary display unit may be determined based on the presence of use of the display unit 31. As an example, if the display unit 31 is separated from the component 30 or is unavailable, the auxiliary display unit may be turned on.

Figure 4:
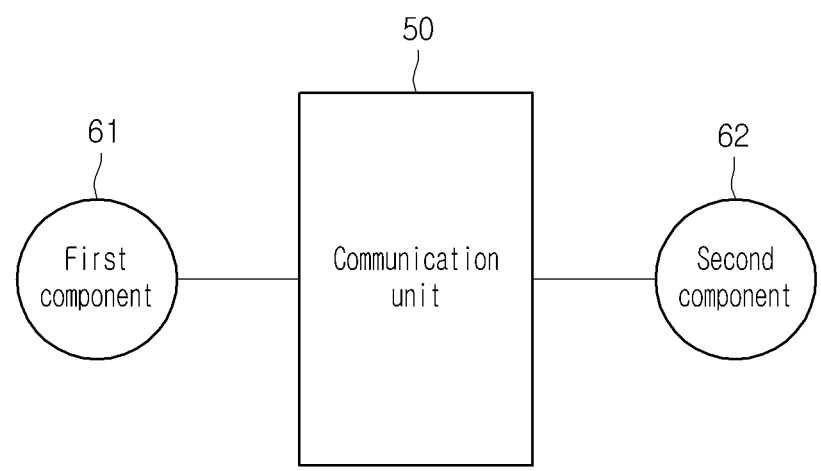
FIG. 4 is a view showing the communication structure of two components that constitute the network system according to a first embodiment.
Figure 5:
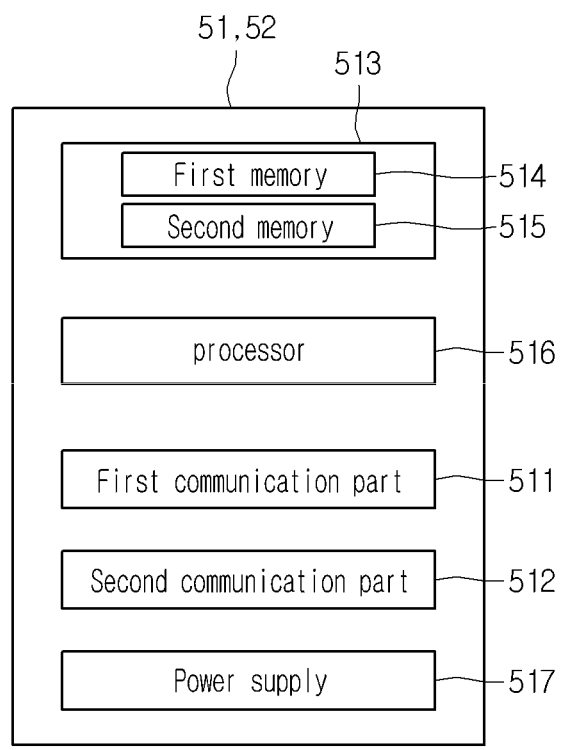
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second communicators is powered on, one of the two communicators may transmit a network participation request signal, and the other of the two communicators may transmit a permission signal. As another example, if any one of the first and second communicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively.

Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
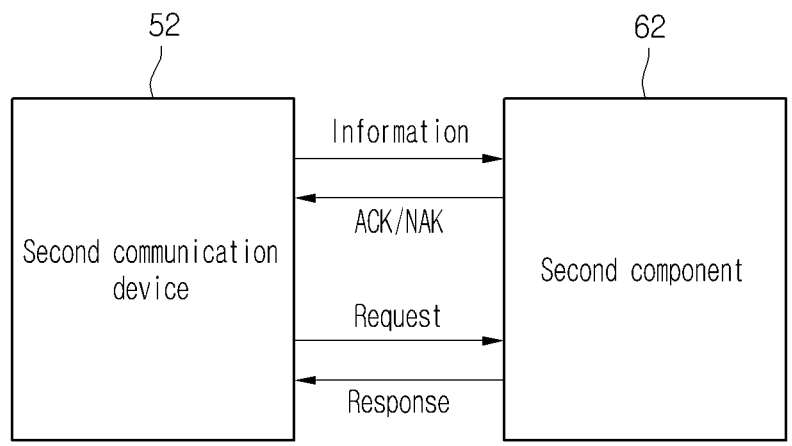
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator part 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator 51 is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
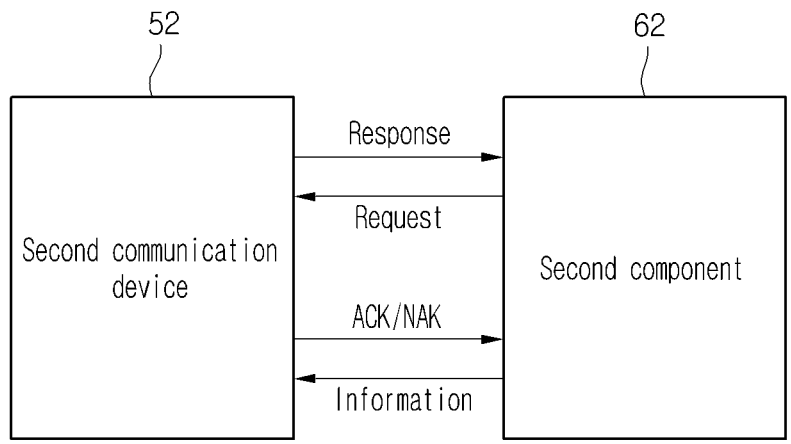
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case Where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case Where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case Where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
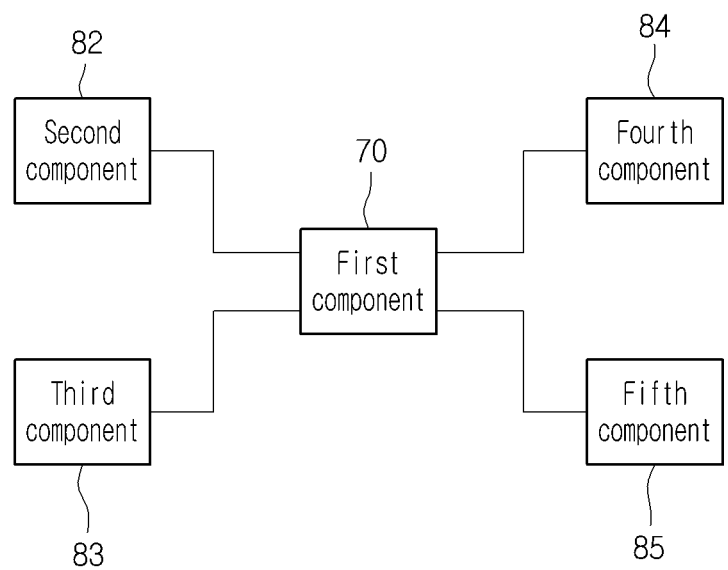
FIG. 8 is a view showing the communication structure of components that constitute the network system according to a third embodiment.
Figure 9:
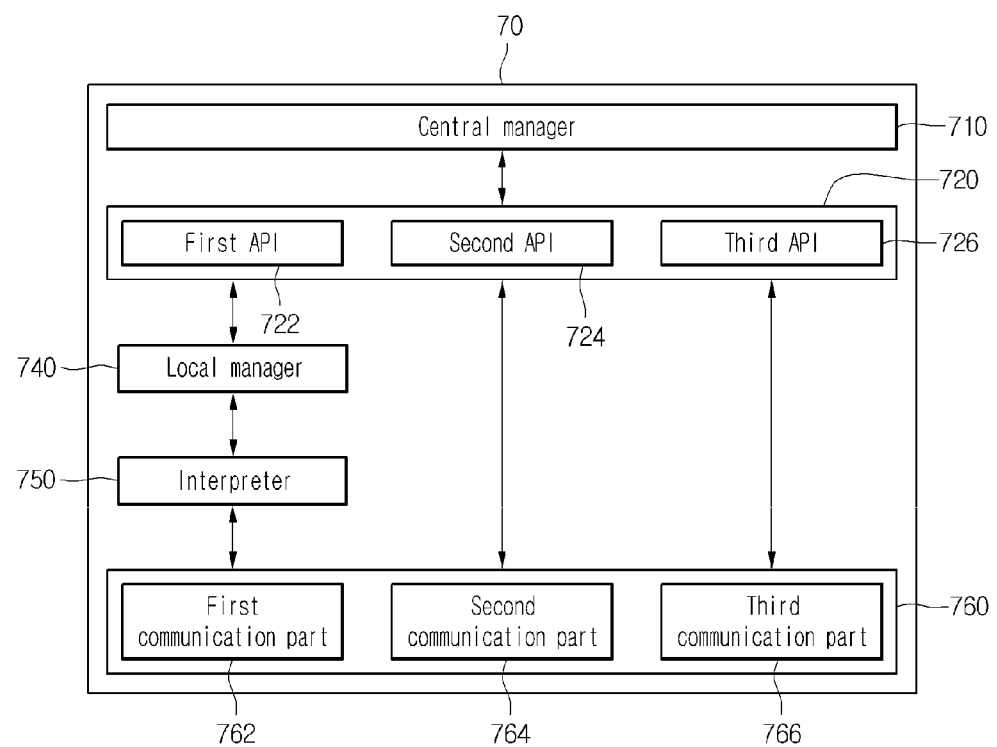
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an PI? for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator.

Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
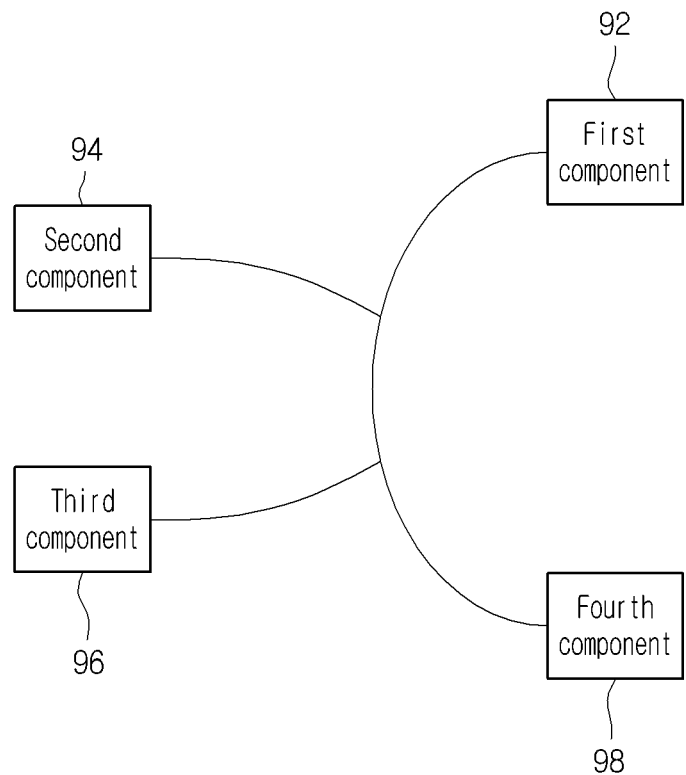
FIG. 10 is a view showing the communication structure of components that constitute the network system according to a fourth embodiment.
Figure 11:
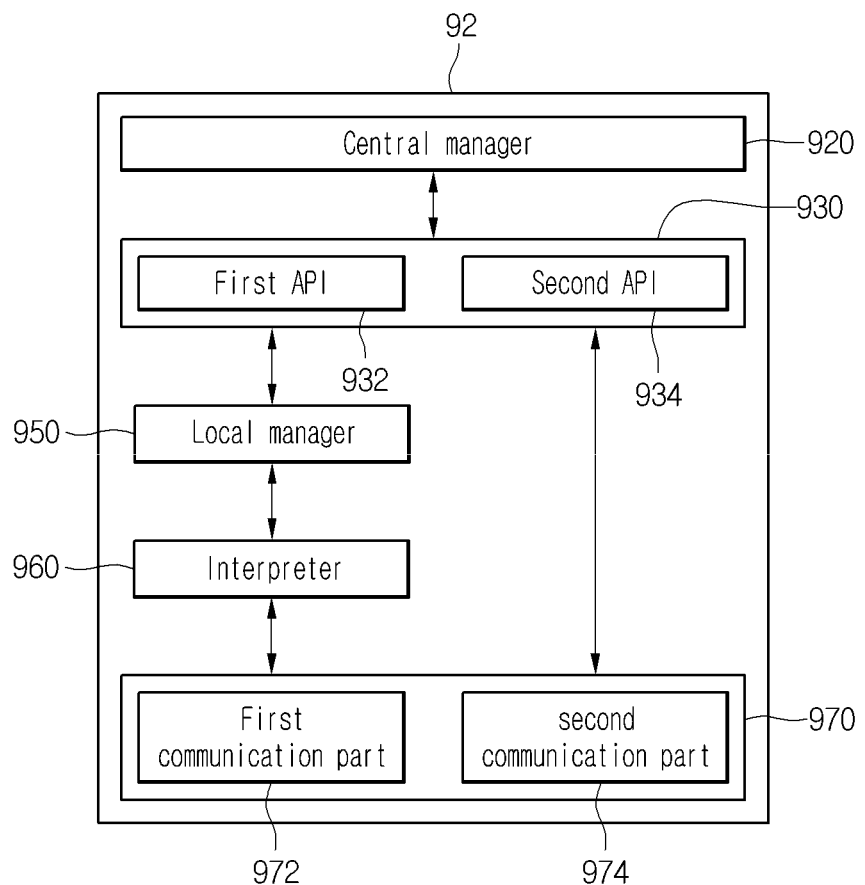
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
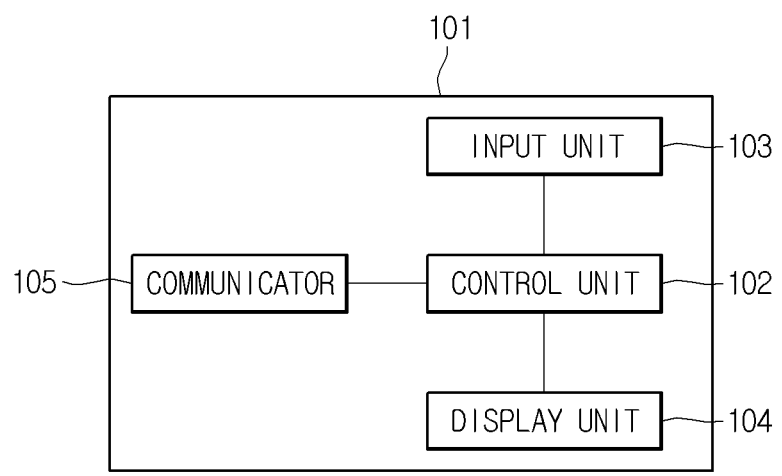
FIG. 12 is a block diagram showing an example an example of a component that constitutes the network system of the present disclosure.

FIG. 12 is a block diagram showing an example an example of a component that constitutes the network system of the present disclosure. The following component 100 may be one component of the UAN or HAN.

Referring to FIG. 12, the component 101 may include a control unit 102, an input unit 103 for inputting an operational command, and a display unit 104 for displaying information. In this instance, the input unit 103 may be provided in the form of a touch screen to the display unit 104. The control unit 102 may communicate with a communicator 105.

The component 100 may further include a sensor, a driver, a memory and the like according to the kind of the component 100. The input unit or display unit may not be provided to the component 100 according to the kind of the component 100. The component 100 may be a function performing component, or may include the function performing component.

Hereinafter, various examples of the operating method of the component 100 will be described.

As an example, if a start command is inputted by the input unit 120, optimal driving time information or time except information (driving method) of the component 100 is determined (determination of the optimal driving condition). The optimal driving time information or time except information is determined so that electricity usage cost or power consumption is decreased. The optimal driving time information may be determined so that the component is immediately driven at a current time, that the component is driven at a selected time or that the driving of the component is delayed. In a case where the optimal driving time is later than the time (current time) recognized by a user, information for informing the user of this fact may be displayed in the display unit 130. A driving method or time may be inputted through the input unit 120 before the start command is inputted through the input unit 120, and the inputted driving mode or time may be changed or maintained by the determination of the optimal driving time information or time except information. That is, in a case where a specific operation condition is inputted through the input unit, the driving condition of the component is determined based on at least information related to energy cost. Then, the component is operated based on the determined optimal driving condition. Information changed from the inputted driving operation condition in the optimal driving condition or information not inputted may be displayed in the display unit.

As another example, if at least a portion of the high-cost section is included in a driving time section of the component, the driving time section may be changed. Specifically, the driving time section may be defined by a driving start time and a driving end time. The change of the driving time section refers to a change of at least one of the driving start time and the driving end time. If the driving time section is changed, the component may not be operated in at least a portion of the high-cost section. As an example, if the high-cost information is recognized while the component is operated, the operation of the component may be immediately stopped. Alternatively, if the high-cost information is inputted while the component is operated, the operation of the component may be stopped after the component is operated for a certain period of time. If the high-cost section is ended, the component in a non-operation state may be re-operated. The driving time section may be changed entirely or partially. The end time of the changed driving time section may be a time when the high-cost information is recognized or the previous time (the low-cost section prior to the high-cost section).

Alternatively, the end time of the changed driving time section may be positioned at a low-cost section that comes after the high-cost section is ended. Alternatively, the start time of the changed driving time section may be positioned at a low-cost section that comes after the high-cost section is ended.

As still another example, if a specific information is inputted through the input unit 120, recommendation information (energy information or additional information) on the operation mode or time of the component or the like may be displayed in the display unit. The driving method, power consumption, power saving level or driving start time of the component 100 may be recommended. In this instance, the kind of information inputted through the input unit 120 and another information may be displayed. For example, if a driving method is inputted, information except the driving method may be recommended.

In addition to the recommendation information, information related to energy when the component is operated (when the component is operated in a specific course at a specific time), e.g., electricity usage cost may be further displayed as recommendation information. In this case, the user may select recommendation information, or may select a user's desired operation mode or time regardless of the recommendation information.

For example, if the time information related to the operation of the component is inputted through the input unit, at least a power-savable driving time of the component may be recommended based on the energy information and the time information, or the component may be operated at a specific time so that the energy usage cost of the component can be reduced. In this instance, the recommended driving time or specific time for power saving may be a time changed from the inputted time. The recommended driving time may include an operation start time or operation end time.

Alternatively, in a case where the driving method is inputted through the input unit, at least a power-savable driving time of the component may be recommended based on the energy information and the time information, or the component may be operated at a specific time so that the energy usage cost of the component can be reduced. In this instance, the recommended driving time or specific time for power saving may be a time changed from the inputted time.

Alternatively, in a case where the energy usage cost or energy usage amount of the component is inputted through the input unit, the driving method (including time or mode) of the component may be recommended so as to satisfy a lower value than that of the information inputted based on the energy information and inputted information, or the component may be driven in a specific driving method.

As still another example, if the component is turned on, an optimal time from a current time to a specific time may be recommended. For example, the optimal time may be a time when the energy cost is lowest for the current time to the specific time.

As still another example, the component 100 may be operated in a general mode in which it is operated without reducing electricity usage cost or power consumption, or may be operated in a power saving mode that reduces the electricity usage cost or power consumption as compared with the general mode. In a case where the general mode is selected, the component 100 may be driven based on a condition inputted by the user regardless of energy information. In a case where the power saving mode is selected, the driving method, operation time and operation period when the component 100 is operated in the general mode may be changed, so that the component 100 can be operated. That is, the operation method of the component in the general mode is different from that of the component in the power saving mode. In the power saving mode, energy information related to the information through the input unit or additional information and energy information not inputted through the input unit or additional information may be displayed.

The general or power saving mode may be manually set or changed by the user through the input unit, or the component 100 may automatically set or change the general or power saving mode based on the energy information. Alternatively, the general mode or power saving mode may be selected by receiving a setup or change command from another component. Any one of the general mode and the power saving mode may be set as a basic mode in the component 100.

Alternatively, the component 100 may be operated in one of a plurality of power saving modes. That is, the component 100 may be operated in any one of the plurality of power saving modes so as to reduce energy consumption or energy usage cost according to the kind of at least the energy information.

The plurality of power saving modes may include a manual mode in which information for driving the component 100 is manually selected, and an automatic mode in which the information for driving the component 100 is automatically selected.

The component may be operated in a time reduction mode in addition to the general mode and the power saving mode. In the time reduction mode, the operation time of the component is shorter than that of the component in the general mode. In this instance, the energy usage cost (or energy consumption) in the time reduction mode may be equal to or greater than the energy usage cost (or energy consumption) in the general mode. The energy usage cost (or energy consumption) in the time reduction mode may be changed by varying the operation method of the component. The operation time of the component in the power saving mode is equal to or longer than that of the component in the general mode. In this instance, performances (e.g., washing performances, cooking performances or the like) of the component in the general mode, the time reduction mode and the power saving mode may be identical or similar to one another.

As still another example, the plurality of power saving modes may include a mode leveled corresponding to the degree of reduction of electricity cost or power consumption. For example, the power consumption or electricity usage cost when the component is operated in a first power saving mode may be smaller than that when the component is operated in a second power saving mode. Alternatively, the plurality of power saving mode may include at least two modes that share a common control unit or method for the purpose of the power-saving driving of the component 100. The plurality of power saving modes may be mutually changed manually or automatically. Alternatively, the plurality of power saving modes may control the component using different methods from one another. That is, the control methods of the component are different from one another in the plurality of power saving modes.

As still another example, at least time information related to the driving of the component 100 is inputted through the input unit 130, the driving method of the component for reducing a value related to energy may be determined based on the information related to energy and the inputted time information. Then, the determined driving method may be displayed in the display unit 130, or the component 100 may be operated using the determined driving method. The value related to energy is a power consumption or electricity usage cost when the component is driven. The time information related to the driving of the component 100 may be at least one of driving start time, driving end time and driving time range. The determined driving method may include a method in which the component is driven within a time range including the recognized time. Alternatively, the determined driving method may include a method in which the component is driven at a time changed from the inputted time.

As still another example, if the driving method of the component 100 is inputted through the input unit 130, the driving method of the component for reducing a value related to energy may be determined based on the information related to energy and the inputted time information. Then, the determined driving method may be displayed in the display unit 130, or the component 100 may be operated using the determined driving method. The value related to energy is a power consumption or electricity usage cost when the component is driven. The determined driving method may include a driving method changed from the inputted driving method or a method in which the component is driven using the inputted driving method of an electric product at a specific time. The specific time may be a time zone different from a desired driving time zone of the component or a time zone after the current time.

As still another example, if reference electricity usage cost or reference power consumption is inputted through the input unit 120, the driving method of the component may be determined using cost or electric energy lower than the inputted reference cost or electric energy. The determined driving method may be displayed in the display unit 130 of the component, or the component 100 may be driven using the determined driving method. The determined driving method may include a method in which the component is operated at a time posterior to the current time and a method in which the component is operated in a specific mode at the current time.

As still another example, the component 100 may be operated based on information on a priority order in energy information or additional information recognized by the component 100. The priority order may be set or changed manually or automatically. The presence of consideration of the next priority order may be determined according to the information state of the best order.

For example, in a case where energy cost information as the energy information is a priority order and environment information as the additional information is a posteriority order, the component may be operated based on the energy cost information. Alternatively, in a case where the energy information is a priority order and the additional information is a posteriority order, the energy information includes information related to the reduction of energy consumption or energy cost. Then, the component may be operated based on only the energy information. Alternatively, in a case where the additional information is a priority order and the energy information is a posteriority order, the power or operation time of the component is necessarily increased as a determined result of the additional information. Then, the component may be operated in consideration of the energy information.

Alternatively, the component may include a memory unit in which the operation method of the component is determined by reflecting information on a plural kinds of components. If the component recognizes the information on the plural kinds of components, one of operation methods stored in the memory unit is selected.

As still another example, the component 100 may further include a memory unit in which the operation method obtained by reflecting the energy information and additional information is stored. Therefore, if the information on the plural kinds of components is recognized, one of the operation methods stored in the memory unit may be selected, and the component 100 may be operated using the selected operation method.

As still another example, if high-cost information is recognized in the operation of the component 100, the operation information of the component 100 is stored in the memory unit, and the component 100 may be turned off or stopped. Then, if low-cost information is recognized, the component 100 may be re-operated based on the operation information stored in the memory unit.

As still another example, if the high-cost information is recognized in the operation of the component 100, the operation of the component may be changed based on information related to the previous operation of the component. In this instance, the information related to the previous operation of the component may be information related to power consumption of the component, energy usage cost information, average of target values (target temperature, air flow, humidity, dehumidification or the like) set for a specific time, and resource received by the component when the component is operated for a specific time. The power consumption or energy usage cost information may be average power consumption or average energy usage cost when the component is operated once. The resource may be water or ice. The information related to the resource may be information related to average discharge amount of the resource (water or ice discharge amount in a water cleaner or refrigerator) for a specific time.

For example, if the high-cost information is recognized, the operation of the energy consumption component may be changed so that the energy consumption or energy cost of the component is equal to or lower than the previous value of the information related to the operation of the component.

As still another example, the previous operation information of the component may be stored in the memory unit of the component. A specific order in the previous driving method may be displayed in the display unit of the component. For example, the energy consumption or energy usage cost when a specific course of a washing machine is operated under a first condition and a second condition (which is different from the first condition, and has a greater energy consumption or energy usage cost than that when the specific course is operated under the first condition) may be stored in the memory unit. The order of the first and second conditions may be determined and displayed in the display unit. The order may be determined by an order for each energy usage cost or number of times in use. The operation condition of a priority or posteriority order may be stored in the memory unit, and the driving method of the stored order may be selected by the user.

As still another example, in a case where the energy consumption or energy usage cost of the component according to the operation condition of the component, inputted by the user, exceeds a limitation reference, the component may be forcibly controlled so that the energy consumption or energy usage cost is less than the limitation reference, or a driving method for allowing the energy consumption or energy usage cost to be less than the limitation reference may be displayed in the display unit of the component. In a case where the component is forcibly controlled, information for informing the user of the fact may be displayed in the display unit of the component.

As still another example, if the high-cost information is recognized while the component 100 is operated using the selected driving method, the driving method may be changed or maintained according to the driving method of the component. For example, if the estimated power consumption (or estimated energy usage cost) when the component is operated using the selected driving method is greater than that when the component is operated using a standard driving method, the selected driving method may be changed into the standard driving method. If the estimated power consumption (or estimated energy usage cost) when the component is operated using the selected driving method is equal to or smaller than that when the component is operated using the standard driving method, the selected driving method may be maintained. The standard driving method may be set when the component is manufactured, or may be manually set or changed by the user. Alternatively, the standard driving method may include a plurality of methods, and a specific method may be selected according to the kind of low-cost information.

As still another example, if the high-cost or low-cost information is recognized in the operation of the component 100, the power consumption (or power) of the component 100 may be changed in a portion or entire of the section in which the high-cost or low-cost information is recognized. In this instance, the power consumption (or power) of the component 100 in the recognition of the low-cost information is smaller than that of the component 100 in the recognition of the high-cost information. For example, the power consumption (or power) of the component 100 may be decreased or increased in the portion or entire of the section. Alternatively, the power consumption (or power) of the component 100 may be gradually decreased or repeatedly decreased and decreased in the portion or entire of the section.

As still another example, an energy reduction degree (degree of reducing power consumption or electricity cost) may be differently selected according to the kind or state of energy information or additional information. For example, the energy reduction degree may be differently selected based on the length of a time section greater than the level or value of the energy information or additional information. The reduction degree of electricity cost or power consumption when the value of the energy information or additional information is greater than the reference information value is greater than that of electricity cost or power consumption when the value of the energy information or additional information is smaller than the reference information value. The reference information value may be set as a plurality of reference information values. At least one of the plurality of reference information values may be a value for determining an on-peat time section. Specifically, the length of the on-peak time section may be divided into top, middle and bottom, for example. The reduction degree when the length of the on-peak time section is top is greater than that when the length of the on-peak time section is middle or bottom. Alternatively, in a case where the electricity cost is divided into a plurality of levels, the reduction degree when the electricity cost is expensive is greater than that when the electricity cost is cheap.

As still another example, in a case where the component includes a plurality of energy consumption components, the energy consumption components to be controlled may be differently selected according to the kind or state of the energy information or additional information. For example, the energy consumption components to be controlled may be differently selected according to the energy cost value or energy cost level. The reference information may include a first reference information and a second reference information greater than the first reference information. Alternatively, the reference information value may include a single value. For example, if the value of the energy information or additional information is greater than the second reference information value, the power of a first energy consumption component (function performing component that consumes energy) may be controlled (operation limitation). If the value of the energy information or additional information is between the first and second reference information values, the power of a second energy consumption component (function performing component that consumes energy) may be controlled (operation limitation). If the value of the energy information or additional value is smaller than the first reference information value, electricity may be stored in an energy storage component (the operation of a function performing component that stores energy may be started).

That is, any one of a plurality of control objects or methods may be selected according to the kind or state of the energy information or additional information.

As still another example, if the high-cost information is recognized in the operation of the component 100, the sum of powers of a plurality of energy consumption components that constitute the component 100 and perform the same function may be decreased. The plurality of energy consumption components may be the same kind or different kinds from one another. In a case where the high-cost information is recognized, only some energy consumption components may be turned off, or the power of the some energy consumption components may be decreased. Alternatively, in a case where the high-cost information is recognized, the power of each of the power consumption components may be decreased while the plurality of power consumption components maintain an on-state. Alternatively, in a case where the high-cost is recognized, the power of the plurality of energy consumption components may be decreased with the same power amount or power reduction rate. Alternatively, in a case where the high-cost information is recognized, the power of the plurality of energy consumption components may be decreased with a different power amount or power reduction rate. Alternatively, in a case where the high-cost information is recognized, the plurality of energy consumption components may be alternately turned on and turned off.

As still another example, if the high-cost information is recognized in the operation of the component 100, among a plurality of energy consumption components that constitute the component 100, the function performance of one or more energy consumption components may be limited, and the function of another one or more energy consumption components may be performed. The power consumption of the energy consumption components of which function is limited is greater than that of the energy consumption components of which function is performed. For example, in a case where the high-cost information is recognized while a component with relatively high power is operated, energy consumption components with high power may be turned off, and energy consumption components with low power may be turned on.

As still another example, if the high-cost information is recognized in the operation of the component 100, the operation of energy consumption components that satisfy a limitation condition may be limited among a plurality of energy consumption components that constitute the component. In this instance, the limitation condition may be power consumption, energy used cost or limitation order. That is, among the plurality of energy consumption components, the operation of energy consumption components of which power consumption or energy use cost exceeds a reference value may be limited. Alternatively, the limitation condition may be power consumption that is relatively large among the plurality of energy consumption components.

As still another example, in a case where the operation mode of the component 100 includes a plurality of processes, at least one of the plurality of processes may be limited in the section in which the high-cost information is recognized. The limitation means that the process is stopped or the power consumption in the performance of the process is decreased. For example, in a case where the component is a washing machine, the operation mode may be a standard course, quilt course, wool course or the like. The plurality of processes may include at least one of soaking, washing, rinsing, dehydrating and drying processes. The limited process may be automatically set, or may be manually set or changed.

As still another example, if the high-cost information is recognized in the operation of the component 100, two or more of a plurality of factors related to the operation of one or more energy components (function performing components) that constitute the component may be changed. The factor may include operation speed, operation time, power, operation rate and the like. If the value related to any one of two or more factors is decreased, the value of another factor may be increased.

As an example, when an energy consumption component is a motor, the rotation speed of the motor may decrease, and a rotation time may increase. When the energy consumption component is a heater, the output of the heater may decrease, and an operation time may increase. That is, when high-cost information is recognized, two or more factors associated with the operations of one or more energy consumption components may vary.

Alternatively, when the energy consumption component is a motor, the operation pattern of the motor may vary. Specifically, when the energy consumption component is a motor that rotates a drum included in a washing machine or a washer, the motor may rotate in one direction or another direction. In the case of a washing machine or a washer, the motor is controlled for laundry to be lifted and then dropped. A drum driving motion may be changed according to the rotation speed of the motor and a rotation angle in a specific direction. The drum driving motion may be divided into a general driving motion and one or more special motions (which have a rotation speed faster than the general motion or a large rotation angle in one-time rotation). Furthermore, the power consumption amount of the motor that is driven in the special motion is greater than the power consumption amount of the motor that is driven in the general motion. In this example, when high-cost information is reduced while the motor is being driven in the special motion, the washing machine or the washer may perform the general motion. When the high-cost information is recognized while the general motion is being performed, the washing machine or the washer performs a specific motion to be originally performed at a time when low-cost information is recognized.

As another example, the component 100 may operate for satisfying a reserved time, and when the low-cost information is recognized before the reserved time is satisfied, the component 100 may start an operation at any one time of a section in which the low-cost information is recognized. In this case, since the component 100 starts an operation prior to the reserved time, it may perform a service function for preventing a function from being declined after the operation of the component 100 is completed. The reserved time may be one of driving start time, driving end time and driving time sections. As an example, when the component 100 is a washing machine or a washer, the operation of the washing machine or washer is completed, and thereafter the component 100 may rotate the motor, which rotates a drum accommodating laundry, at certain intervals for preventing the wrinkle of the laundry. As another example, the component 100 is a cooking appliance, the operation of the cooking appliance is completed, and thereafter a heater may operate at certain intervals or continuously operate at minimum output for preventing a cooked item from cooling.

As another example, the operation may be controlled based on the specific order of a plurality of components which may be operated with respect to energy. The specific order may be any one of the order of components which must be firstly operated, the order of operation start, and the order of energy consumption amount or energy usage cost. For example, the bigger the current energy consumption amount, the current energy usage cost, the energy consumption amount for a predetermined time, and the energy usage cost for a predetermined time are, it may be set at the latter order. Alternatively, the operation order may be manually selected by a user, and a plurality of the same or other species components may be set at the same order.

In a case where high-cost information is recognized during the operation of a plurality of components, the operation of the component in the last order may be limited. Alternatively, the operation of a plurality of components in the latter orders (components in a plurality of orders) may be limited. And, if low-cost information is recognized in the state where the operation of components is limited, the components with their operations limited may be again operated. The reference for limitation on operation may be any one of the number of operable components and available total energy consumption amount or total energy usage cost. At this time, the limitation on operation of components may be immediately performed. Alternatively, in a case where the operation of a component consists of a number of processes, the operation of the component may be limited after one process is completed. Alternatively, the operation of the component may be limited after high-cost information is recognized and a predetermined time is passed. Alternatively, after a component whose operation is to be limited has consumed a predetermined amount of energy or the energy usage cost reaches a certain level, the operation of the component may be limited. Information notifying that the operation is limited may be displayed in the display unit of a component with its operation limited. Alternatively, information notifying that the operation is limited may be displayed in the display unit of other component which may control the component.

As another example, only when the time for recognition of high-cost information (e.g., on-peak time) exceeds a reference time, the control may be performed for reducing the energy which the component has used. Alternatively, high-cost information is recognized, and then the control is immediately performed for reducing energy, and when the time for performing the control has passed a predetermined time, whether the high-cost information may be recognized for maintenance or change of the current state may be again determined. This is intended to prevent the method of operating the component from being often changed.

For another example, although not shown, the network system may include an accessory component or a consumable handling component. The accessory component may be an energy network-only component, which performs an additional function for the energy network. For example, the accessory component may be an energy network-only weather reception antenna.

The consumable handling component may be a component for storing, supplying, and transferring a consumable and confirms or recognizes information about the consumable. For example, the consumable may be a material or product, which is used or handled during the operation of the component. Also, the consumable handling component may be managed in the energy network, e.g., the energy management component.

For example, the consumable may be a washing cloth of a washing machine, a cooking item of a cooking apparatus, or a detergent for cleaning the washing cloth in the washing machine, or a fiber conditioner, or seasoning for cooking item.

Figure 13:
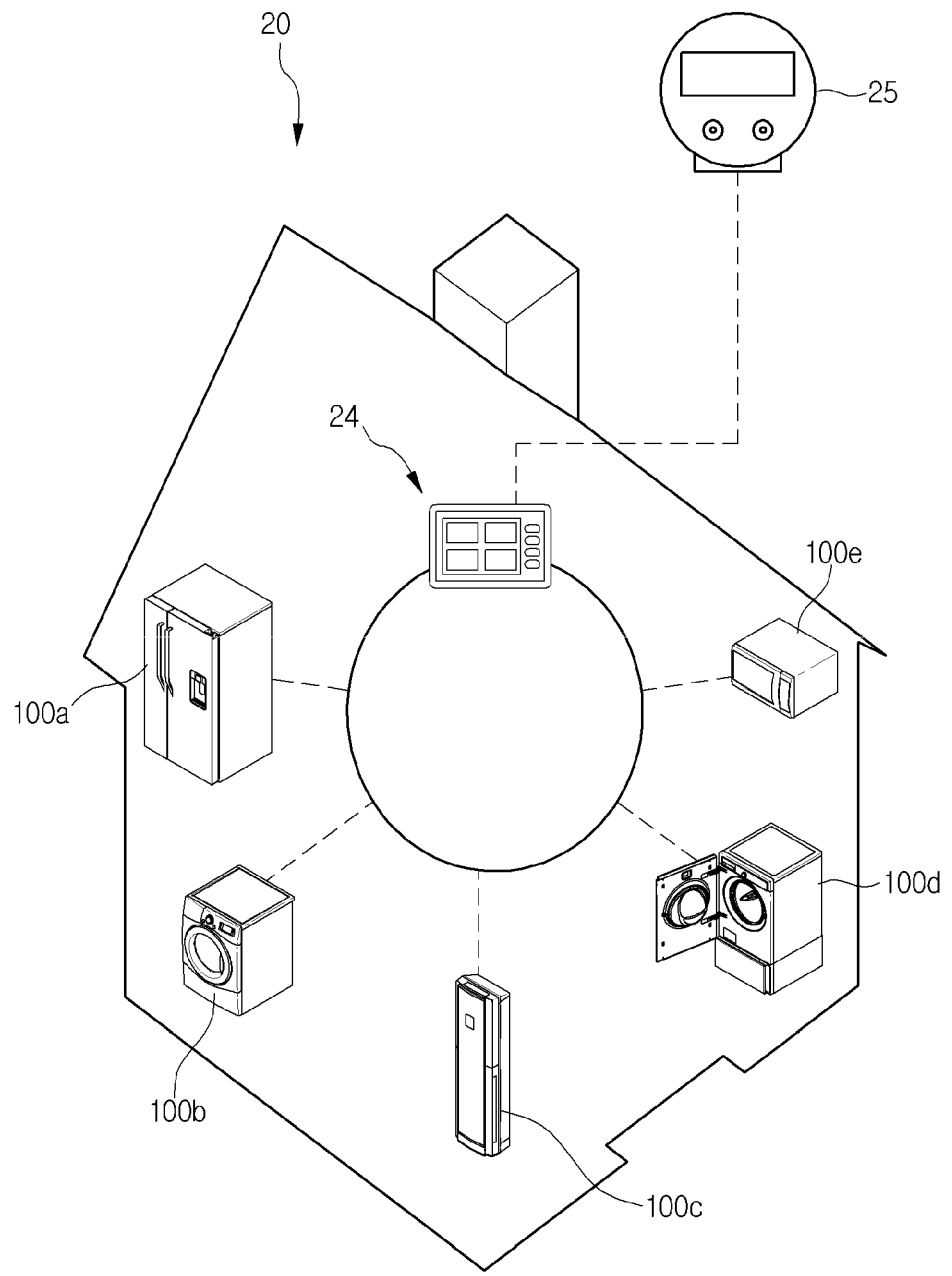
FIG. 13 is a schematic view illustrating a home network according to an embodiment.

FIG. 13 is a schematic view illustrating a home network according to an embodiment.

Referring to FIG. 13, a home network 20 according to an embodiment includes an energy measurement unit 25 (e.g., a smart meter) capable of measuring the cost of power and/or electricity, being supplied to each home, in real-time from the utility network 10, and an energy management unit 24 connected to the energy measurement unit 25 and an electric product and controlling the operation thereof.

The energy management unit 24 is connected to electric products, the energy consumption units 26, such as a refrigerator 100*a*, a washing machine 100*b*, an air conditioner 100*c*, a drying machine 100*d*, and a cooking appliance 100*e* through an in-house network for two-way communication. In-house communication may be performed by wireless communication such as Zigbee, WiFi or the like or by wire communication such as power line communication (PLC). Furthermore, the electric products may be connected to each other so as to communicate with each other.

FIG. 14 is a view illustrating power information provided to a component and a power consumption change corresponding thereto according to an embodiment of the present invention.

A specific component constituting the utility network 10 or the home network 20 may receive energy information through a communication means. For example, the energy management unit 24 or the energy measurement unit 25 may receive an electricity amount or electricity information supplied from the utility network 10 to each home. As mentioned above, electricity related information includes time-based pricing and information other than the time-based pricing. The information other than the time-based pricing includes curtailment, Grid emergency, grid reliability, Energy Amount, and operation priority.

FIG. 14 illustrates an example that energy related information on an electrical product (power information), i.e. an information value relating to a driving of an electrical product, is levelized and received.

A time interval that a levelized information value for a driving of the electrical product exceeds a predetermined reference value S may be defined as an example of a high cost interval, and a time interval less than the reference value S may be defined as one example of a low cost interval. Moreover, from the stand point of a power supply source, since the high cost interval is a time interval at which power demand is concentrated, it means a time interval at which power demand needs to be distributed over a low cost interval.

The information value on the driving may be at least one of electricity rates, a change rate of electricity rates, a change rate of power amount, an average value of electricity rates, and an average value of power amounts. The reference value S may be at least one of an average value of the minimum value and the maximum value of power information for a predetermined interval and a reference change rate (for example, the slope of power consumption per unit hour) of power information for a predetermined interval. The reference value S may be set in real time or in advance. The reference value S may be set in a utility network or a home network (such as an input from a consumer direct input, an energy management unit, or a central management unit).

Figure 15:
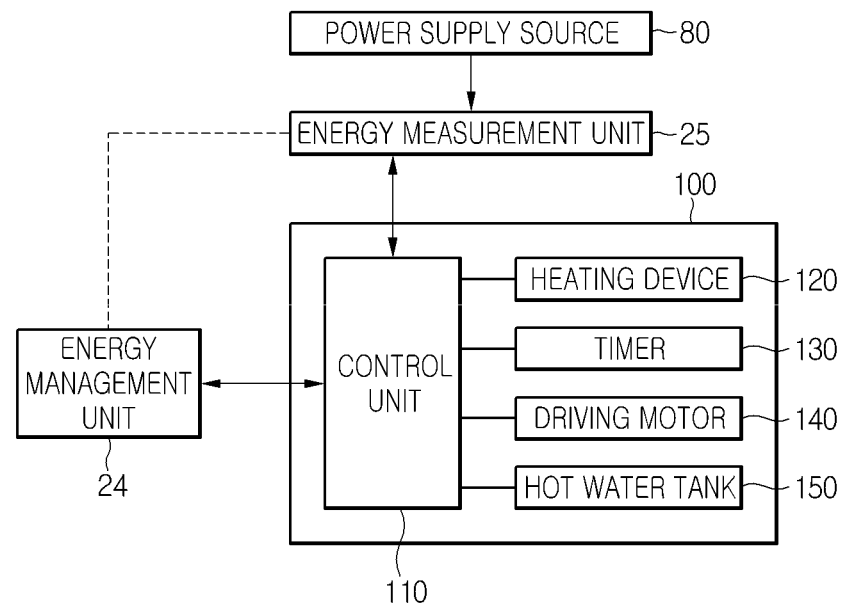
FIG. 15 is a block diagram of a network system relating to one embodiment of an energy consumption unit according to a first embodiment of the present invention.

FIG. 15 is a block diagram of a network system relating to one embodiment of an energy consumption unit according to a first embodiment of the present invention.

Referring to FIG. 15, a home network system 20 according to an embodiment of the present invention includes a washing machine 100 as an energy consumption unit 26, a power supply source 80 supplying power to a home, an energy measurement unit 25 for measuring an electricity amount supplied from the power supply source 80 or an electricity amount used in the washing machine 100, and an energy management unit 24 for managing energy relating to an operation of the washing machine 100.

In the drawing, as a component for controlling an operation of the washing machine 100, the energy management unit 26 is shown, but instead of the energy management unit 26, the central management unit 27 or the energy network assistance unit 28 may be provided.

The washing machine 100 may include a heating device 120 for heating washing water in order to supply warm water, a timer 130 for measuring a washing time of the washing machine 100, a driving motor 140 for driving a drum equipped in the washing machine 100, a warm water tank 150 for storing warm water, and a control unit 110 for controlling an operation of the washing machine 100. The heating device 120, as one energy consumption unit among a plurality of energy consumption units constituting the washing machine 100, may be understood as a component with relatively high power consumption. The heating device 120 may include a heater, and the heater may heat washing water. The heated washing water contributes to the improvement of washing performance.

When the heating device 120 is driven at the high cost interval, an electricity rate depending on an electricity amount consumed in the washing machine 100 becomes relatively expensive. Accordingly, the effective energy use of the washing machine 100 is limited, and from an energy supplier's perspective, power demand is concentrated. As a result, in order to reduce the power consumption of the washing machine 100 at a high cost interval, the driving of the heating device 120 may be limited. However, when the driving of the heating device 120 is limited, it becomes difficult to obtain the washing performance that a user wants.

In this case, the washing machine 100 may increase a predetermined washing time according to a specific cycle (course), instead of limiting a function of the heating device 120. For example, a washing course set for 1 hr washing with washing water of 60° C. may be adjusted to (replaced with) a course set for 1 hr 20 min washing with washing water of 25° C. At a high cost interval. Of course, power consumption in the adjusted course may be less than that in the previous course. If the high cost interval is recognized, the energy management unit 24 may deliver a predetermined command to the control unit 110 in order to adjust the washing course.

Moreover, a function of the driving motor 140 may be limited at the high cost interval. For example, the rpm of the driving motor 140 may be reduced in a dehydration cycle, and instead of that, the driving time of the driving motor 140 may be increased.

The warm water tank 150 may store washing water, which is heated during a low cost interval. The warm water tank 150 may maintain an insulating state with respect to an external in order to maintain a warm water state. When the high cost interval comes, the control unit 110 may control to perform washing with warm water stored in the warm water tank 150, instead of heating washing water by the heating device 120.

Thus, by limiting a function (an operation) of an energy consumption unit having high power consumption but performing an alternative function to obtain the washing performance of a washing machine, inexpensive electricity is used.

Figure 16:
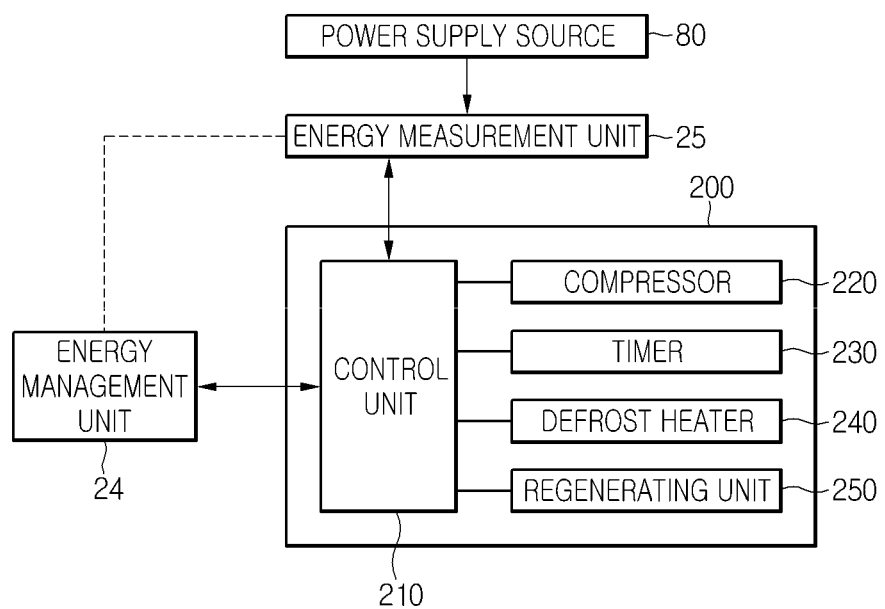
FIG. 16 is a block diagram of a network system relating to another embodiment of an energy consumption unit according to a first embodiment of the present invention.

FIG. 16 is a block diagram of a network system relating to another embodiment of an energy consumption unit according to a first embodiment of the present invention.

Referring to FIG. 16, a home network system 20 according to an embodiment of the present invention includes a refrigerator 200 as an energy consumption unit 26, a power supply source 80 supplying power to a home, an energy measurement unit 25 for measuring an electricity amount supplied from the power supply source 80 or an electricity amount used in the refrigerator 200, and an energy management unit 24 for managing energy relating to an operation of the refrigerator 200.

In FIG. 16, as a component for controlling an operation of the washing machine 100, an energy management unit 24 is shown, but instead of the energy management unit 24, the central management unit 27 or the energy network assistance unit 28 may be provided.

The refrigerator 200 may include a compressor 220 for compressing a predetermined refrigerant in order to drive a refrigeration cycle, a timer 130 for measuring a driving time of the refrigeration cycle 100, a defrost heater 240 for defrosting an evaporator constituting the refrigeration cycle, a regenerating unit 250 for storing cold air generated by driving the refrigeration cycle, and a control unit 210 for controlling an operation of the refrigerator 200. The compressor 220 and the defrost heater 240, as one energy consumption unit constituting the refrigerator 200, may be understood as a component with relatively high power consumption.

When a high cost interval comes, a function of the compressor 220 may be limited. That is, by adjusting a current applied to the compressor 220, a cooling power of the compressor 220 (an input work of a compressor) may be lowered. When the cooling power of the compressor 220 is lowered, the cooling performance of the refrigerator 200 may be deteriorated. In order to prevent such cooling performance deterioration, a driving rate of the compressor 220 (that is, a time ratio of a compressor ON time to a total time) may be increased. Of course, power necessary for increasing the driving rate of the compressor 220 may be less than that necessary for increasing the cooling power of the compressor 220.

Moreover, a function of the defrost heater 240 may be limited. However, instead of limiting an operation of the defrost heater 240 with high power consumption, by driving a reverse refrigeration cycle with a 4-way valve, a defrost effect of the evaporator may be obtained. Of course, power consumed for driving the reverse refrigeration cycle for a predetermined time may be less than that consumed for an operation of the defrost heater 240.

At a low cost interval, the regenerating unit 250 may store part of cold air generated by a refrigeration cycle. For easy storage of cold air, the regenerating unit 250 may have an insulating structure applied. When a high cost interval comes, instead of generating cold air by driving the compressor 220, a refrigerator may perform a cooling function by using the cold air stored in the regenerating unit 250

Figure 17:
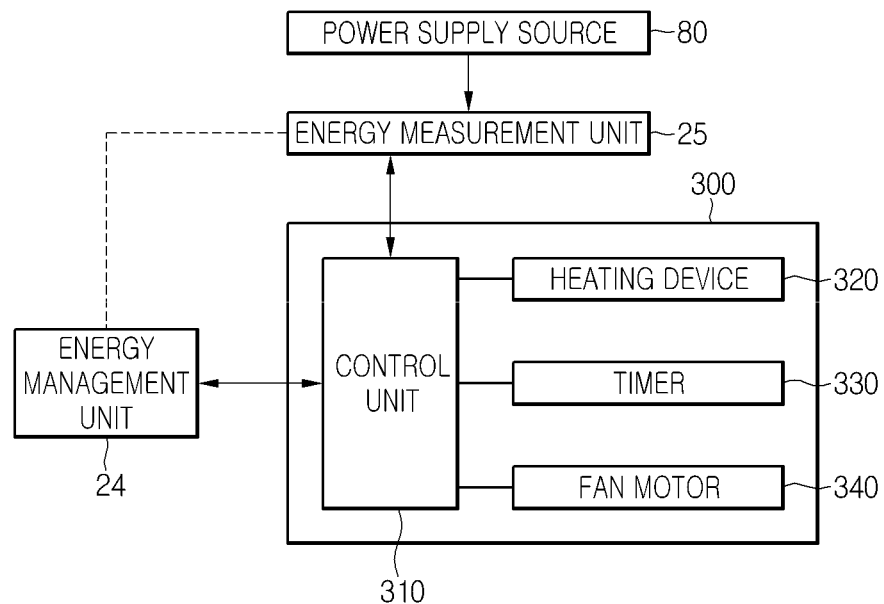
FIG. 17 is a block diagram of a network system relating to another embodiment of an energy consumption unit according to a first embodiment of the present invention.

FIG. 17 is a block diagram of a network system relating to another embodiment of an energy consumption unit according to a first embodiment of the present invention.

Referring to FIG. 17, a home network system 20 according to an embodiment of the present invention includes a drier 300 as an energy consumption unit 26, a power supply source 80 supplying power to a home, an energy measurement unit 25 for measuring an electricity amount supplied from the power supply source 80 or an electricity amount used in the drier 300, and an energy management unit 24 for managing energy relating to an operation of the drier 300. In FIG. 17, as a component for controlling an operation of the drier 300, an energy management unit 24 is shown, but instead of the energy management unit 24, the central management unit 27 or the energy network assistance unit 28 may be provided.

The drier 300 may include a heating device 320 for heating air to dry the laundry, a timer 330 for measuring an operating time of the driver 200, a fan motor 340 for circulating dry air in the drier 300, and a control unit 310 for controlling an operation of the drier 300. The heating device 320, as one energy consumption unit constituting the drier 300, may be understood as a component with relatively high power consumption.

When a high cost interval comes, a function of the heating device 320 may be limited. That is, a current applied to the heating device 320 may be switched off. In this case, generating of hot air may be limited. However, when an operation of the heating device 320 is turned off, drying performance may be deteriorated. In order to prevent such drying performance deterioration, the number of rotations of the fan motor 340 may be increased or a driving time thereof may be increased. In this case, an amount of air circulating in the drier 300 may be increased. Of course, power necessary for increasing the number of rotations of the fan motor 340 or increasing a driving time of the fan motor 340 may be less than that necessary for turning on the heating device 320. According to such a configuration and control method, energy management and usage efficiency relating to the driving of the electrical product may be improved.

Figure 18:
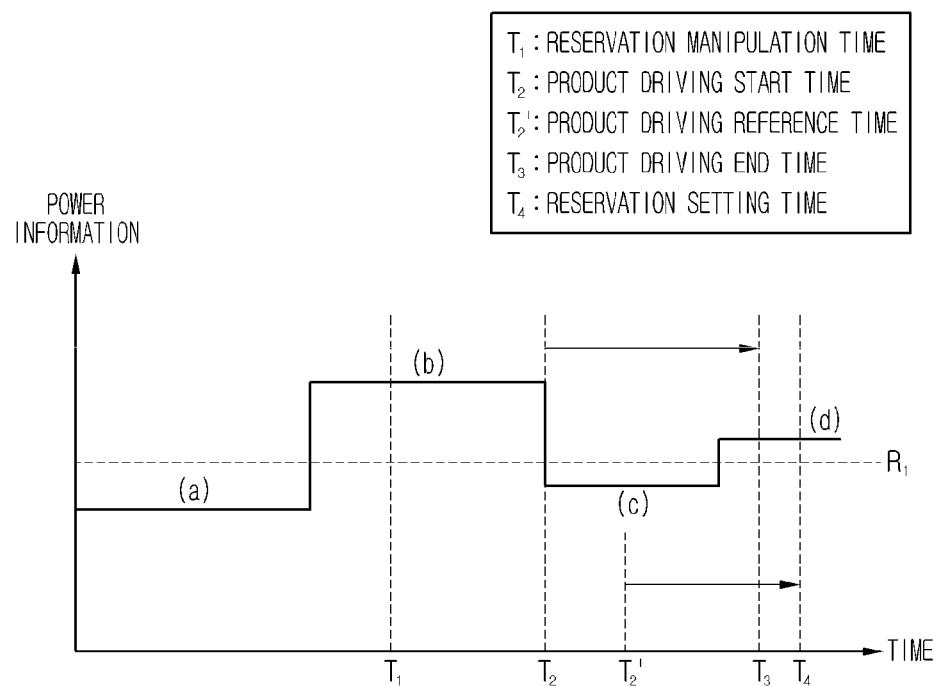
FIG. 18 is a view illustrating a relation between time and power information in relation to the reservation and driving of an electrical product according to a second embodiment of the present invention.

FIG. 18 is a view illustrating a relation between time and power information in relation to the reservation and driving of an electrical product according to a second embodiment of the present invention.

A specific component constituting the utility network 10 or the home network 20 may receive energy information through a communication means. For example, the energy management unit 24 or the energy measurement unit 25 may receive an electricity amount or electricity information supplied from the utility network 10 to each home FIG. 18 illustrates an example that energy related information (power information) on a specific component (for example, an electrical product), i.e. an information value relating to a driving of an electrical product, is levelized and received. A time interval at which a levelized information value relating to the driving of the electrical product exceeds a predetermined reference value R1 may be defined as an on-peak time interval or a high cost information interval, and a time interval less than the reference value R1 may be defined as an off-peak time interval or a low cost information interval. That is, (a) and (c) intervals are defined as a low cost information interval and (b) and (d) intervals are defined as a high cost information interval.

The information value on the driving may be at least one of electricity rates, power amounts, a change rate of electricity rates, a change rate of power amount, an average value of electricity rates, and an average value of power amounts. The reference value R1 may be at least one of an average value of the minimum value and the maximum value for a predetermined interval and a reference change rate (for example, the slope of power consumption per unit hour) of power information for a predetermined interval. The reference value R1 may be set in real time or in advance. The reference value R1 may be set in a utility network or a home network (an input from a consumer direct input, an energy management unit, or a central management unit).

In summary, the high cost information interval may mean a time interval at which an electrical product is driven with a relatively expensive electricity rate (or excessive power amount demand), and the low cost information interval may mean a time interval at which an electrical product is driven with a relatively cheap electricity rate (or insufficient power amount demand). Moreover, from the stand point of a power supply source, since the high cost information interval is a time interval at which power demand is concentrated, it means a time interval at which power demand needs to be distributed over a low cost information interval.

Referring to FIG. 18 again, while levelized power information is received, the driving of an electrical product may be reserved. In more detail, a user may manipulate the electrical product or the energy management unit 24 at the time T1 so that it is reserved for the electrical product to perform a specific course. As one example, the electrical product may be reserved to terminate the course driving before the time T4 (a reservation set point) elapses.

When a user inputs the reservation time T4 on the specific course and driving termination, a driving time of the specific course is calculated back from the driving termination time so that the product driving reference time T2' is calculated. This calculation may be performed by the control unit of the electrical product or the energy management unit 24. That is, the electrical product may at least start the driving before the time T2' elapses.

However, the electrical product may not wait until it reaches the time T2' and may be immediately driven when the high cost information interval b ends. That is, the driving start time T2 of the electrical product is the time that the high cost information interval b ends, and may be a time before the time T2'.

Thus, since the electrical product is driven as entering the low cost information interval c, it may receive low-cost electricity. Also, by preventing the electrical product from being driven in a high cost information interval, peak demand on electricity may be prevented.

Another embodiment is suggested.

When electrical product's reservation is set with respect to the driving start time, it may be set to start driving at 1:00 p.m., for example. However, after the driving reservation of an electrical product is set, if there is a low cost information interval before 1:00 p.m., the electrical product may be immediately driven (compulsorily driven).

In this case, an electrical product is driven according to a user's intention. Accordingly, an electrical product may immediately display driving related content at the time of when an electrical product is reserved. A user may confirm or reject the displayed content.

Moreover, when the electrical product is reserved to be driven within a predetermined time interval, it may be reserved to start and end the driving between 1:00 p.m. and 6:00 p.m. In this case, after the driving reservation of an electrical product is set, if there is a low cost information interval before 1:00 p.m., the electrical product may be immediately driven.

Figure 19:
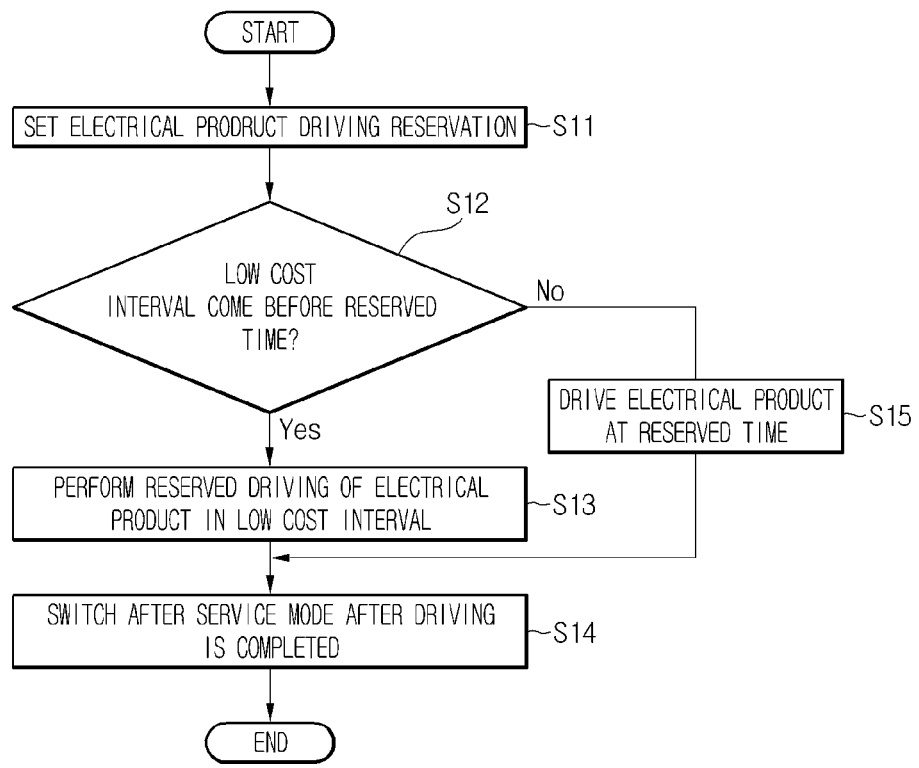
FIG. 19 is a flowchart relating to an operation control of an electrical product according to a second embodiment of the present invention.

FIG. 19 is a flowchart relating to an operation control of an electrical product according to a second embodiment of the present invention. Referring to FIG. 19, an operation of an electrical product may be controlled based on energy information, that is, power information relating to the driving of the electrical product.

First, a user may set the driving reservation of an electrical product. As one example, the driving reservation may be the reservation for the driving end time. The driving reservation may be made directly through an electronic product or through the energy management unit 24 in operation S11.

The electrical product may be set to be in a standby mode until a reserved time. It is determined whether a low cost information interval comes while the electrical product is in a standby mode. That is, according to the received energy information (power information), it is recognized whether a low cost information interval comes. Of course, the energy information may be provided to the energy management unit 24, the energy measurement unit 25, or an electrical product as an energy consumption unit in operation S12.

When it is recognized that the low cost information interval comes, the electrical product performs a reserved driving. That is, the electrical product may be immediately driven without waiting for the set reservation time. Of course, when the time at which the driving reservation of an electrical product is set in operation S11 corresponds to a low cost information interval, an electrical product may be driven at the same time as the reservation is set in operation S13.

When the driving of the electrical product is completed, the electrical product changes into an after service mode (an additional cycle mode) until a specific signal is recognized, for example, it reaches a reserved end time (reservation is made for end time).

The after service mode will be described.

When the electrical product is a washing machine 100, the washing machine 100 may perform a wrinkle prevention driving in order to prevent the laundry from being wrinkled and tangled together after washing. As one example, a drum equipped in the washing machine 100 may slowly rotate to untangle the laundry. In the after service mode, the number of rotations of the drum may be set in advance with a value, which is less than the number of rotations (or less than a power amount) of the drum in a washing mode.

When the electrical product is a cooking appliance 104, the cooking appliance 104 may drive a heating device in order to keep food warm after cooking the food. Of course, the amount of heat for the food is enough only if it can keep the food warm, and is set in advance less than that for cooking.

If the electrical product is drier, the drier may perform a driving operation to lower the moisture in a tub (a drying space) after drying the laundry. Here, the driving operation for lowering moisture is to circulate air by operating a fan motor, and the number of rotations of the fan motor may be set less than that for a dry cycle. Even if the dry cycle is terminated, since high moisture in the tub is maintained for a predetermined time, the after service mode may be defined as the driving for circulating air in order to uniformly maintain the dryness of the laundry.

If the electronic product is a dish washer, the dish washer may perform a driving operation of a fan motor to low the moisture in a washing space or a UV lamp to sterilize dishes, after a washing cycle. Here, the number of rotations of the fan motor may be set less than that for drying dishes.

As mentioned above, after an operation of the electrical product is completed, in order to prevent the deterioration of a function that the electrical product performs, the electrical product may operate in a specific mode (driving). Thus, if the driving of the electronic product is completed before a reservation time, an after service mode is performed until the reservation time comes, so that satisfaction on electrical product usage may be improved in operation S14.

Another embodiment is suggested.

Although it is described above that the after service mode is performed until the reserved end time comes, the after service mode may be continuously performed until a user manipulates the electrical product again. The re-manipulation of the electrical product includes opening the door of an electrical product.

For example, until a user opens the door of each product in order to take out the laundry, the dishes, and the food, the after service mode may be continuously performed. In more detail, each of the washing machine 100, the cooking appliance 104, the drier, and the dish washer may include a door switch. When a specific signal (a door open signal) is recognized by the door switch, the after service mode may stop.

When the re-manipulation of the electronic product, for example, an additional user manipulation and an input or display unit manipulation, is made, the after service mode may stop. For example, when a user inputs a driving stop command on an electrical product through the input unit or display unit, the after service mode may stop.

Moreover, if the low cost information interval does not come in operation S12, the electrical product may be driven at the set reservation time. Moreover, when the driving of the electrical product is completed, until a door open signal of the electrical product is recognized, the after service mode may be continuously performed.

Another embodiment is suggested.

Although the case that the reservation command of the electrical product is an end time reservation is described in FIGS. 18 and 19, unlike this, even when the reservation command of the electrical product is a start time reservation or a time interval reservation, the after service mode may be performed. If the reservation command of the electrical product is a start time reservation, the after service mode may be performed from the start time to the reference time obtained by calculating the time of a specific operation of the electrical product.

For example, although starting of an operation of an electrical product (1 hr cycle) at 1:00 p.m. is reserved, the electrical product may operate at 11:00 a.m. due to the arrival of a low cost information interval and its operation may be completed at 12:00 p.m. In this case, the after service mode may be performed until the reference time for original termination, that is, 2:00 p.m. Additionally, if the reservation command is a time interval, when the electrical product is immediately driven due to the arrival of a low cost information interval, the after service mode may be performed until the end time of the time interval.

Another embodiment is suggested.

At the timing of when a driving command of an electrical product is set, the electrical product of the energy management unit 24 may recommend an operating time or a time interval on the basis of power information. The recommendation may be done through a method of displaying an inexpensive time slot to a user. Even when a user selects a predetermined time or time interval according to the recommendation of the electrical product or the energy management unit 24, if a low cost information interval comes before that, the electrical product may be immediately driven.

Moreover, after the driving is completed, the after service mode may be continuously performed until the end time of the original recommendation time.

As mentioned above, since an electrical product is driven at a low cost information interval, energy cost and management efficiency may be improved. Furthermore, since an after service mode is performed after the driving of the electrical product, user's satisfaction on a product may be improved.

INDUSTRIAL APPLICABILITY

According to the embodiments, an energy source may be effectively managed, and an energy rate may be reduced, so that Industrial applicability is considerable.

The invention claimed is:

1. An electric product in communication with a network system and capable of receiving electricity information related to information related to time-based pricing and information other than the information related to time-based pricing, the electric product comprising:
   a first component to perform a function of the electric product;
   a second component to perform the function of the electric product; and
   a control unit to receive the electricity information and operates the first component or the second component selectively,
   wherein the control unit operates the first component when a condition to operate the second component has not been satisfied based on the electricity information, and stops operation of the first component and operates the second component to perform the function of the electric product if the condition to operate the second component is satisfied based on the electricity information during the operation of the first component,
   wherein a high cost time interval is a time interval in which the information related to time-based pricing indicates a value greater than a predetermined reference value, and a low cost interval is a time interval in which the information related to time-based pricing indicates a value less than the predetermined reference value,
   wherein the control unit determines that the condition is satisfied when the control unit determines that the time interval is in the high cost time interval,
   wherein the electric product comprises one of a refrigerator and a washing machine,
   when the electric product comprises the refrigerator, the first component is a compressor and the second component is a regenerating unit, if it is determined that the condition has been not satisfied, the control unit operates the compressor to supply cold air by driving of a refrigeration cycle, and if it is determined the condition is satisfied, the control unit operates the regenerating unit to supply cold air stored in the regenerating unit, and
   when the electric product comprises the washing machine, the first component is a heater and the second component is a warm water tank, if it is determined that the condition has been not satisfied, the control unit operates the heater to supply warm water, and if it is determined the condition is satisfied, the control unit operates the warm tank to supply warm water stored in the warm water tank.

2. The electric product according to claim 1, wherein the information related to time-based pricing includes one of electricity rates, a change rate of electricity rates, a change rate of power amount, an average value of electricity rates, and an average value of power amounts.

3. The electric product according to claim 1, wherein the information other than the information related to time-based pricing includes one of curtailment, grid emergency, grid reliability, energy amount, and operation priority.

4. The electric product according to claim 1, wherein, when the condition to operate the second component is satisfied, the control unit stops the first component and causes the second component to be driven for an additional time to prevent the function performed by the first component from being deteriorated.

5. The electric product according to claim 1, wherein, after the performance of the function of the electric product is completed, the control unit performs an additional operation mode to prevent the performance of the function of the electric product that is completed from being deteriorated.

6. The electric product according to claim 5, wherein the control unit performs the additional operation mode until the control unit receives a signal.

7. The electric product according to claim 6, wherein the electric product is one of a washing machine, a drier, a dish washer and a cooking appliance; and
   wherein the signal received by the control unit is an open signal of a sensor equipped at a door of the electric product.

8. The electric product according to claim 5, wherein the electric product is a washing machine; and
   wherein the additional operation mode comprises a wrinkle prevention operation mode on laundry.

9. The electric product according to claim 5, wherein the electric product is a drier or a dish washer; and
   wherein the additional operation mode comprises driving of a fan motor to circulate air in a drying space or a washing space.

10. The electric product according to claim 5, wherein the electric product is a cooking appliance; and
    wherein the additional operation mode comprises driving of a heating device to maintain a temperature of food.

11. The electric product according to 1, wherein, further comprising an input unit, wherein after a command on an operation of the electric product is sensed by the input unit, if the control unit determines that the time interval is low cost interval, an operation of the energy consumption unit is performed.

12. The electric product according to claim 11, wherein the command sensed by the input unit is one of commands on an operation end time, operation start time, and reservation of a operation time interval.

13. The electric product according to claim 12, wherein, if the control unit determines that the time interval is the low cost interval, the control unit causes the operation of the electric product to be immediately driven instead of waiting for the reserved operation time interval.

14. The electric product according to claim 12, wherein after the operation of the electric product is completed, the control unit causes an additional cycle to be performed until the operation end time or the end time of the operation time interval.

15. The electric product according to claim 12, wherein after the operation of the electric product is completed, the control unit causes an additional cycle to be performed from the operation start time to a reference time obtained by calculating an operating time of the electric product.

16. The electric product according to claim 11, wherein a specific operation time of the electric product is recommended, and the control unit causes an additional cycle to be performed until the end time of a recommended operation time after the operation of the electric product is completed.

17. An electric product, comprising:
a cabinet that receives a consumable and is openable;
a closure that selectively closes the cabinet;
a driving unit in the cabinet to manage the consumable the driving unit comprising a first component and a second component;
a controller that controls the first component or the second component based upon a main operation mode of the electric product,
wherein the controller operates the first component when a condition to operate the second component has not been satisfied, and stops operation of the first component and operates the second component to perform the function of the electric product if the condition is satisfied during the operation of the first component,
wherein the controller controls the second component to perform an additional operation mode of the electric product to prevent a state of the consumable after the main operation mode of the electric product is completed from being deteriorated,
wherein the control unit the second component to perform the additional operation mode until the control unit receives a signal, and
wherein the electric product is one of a washing machine, a drier, a dish washer and a cooking appliance, and the signal received by the control unit is an open signal of a sensor equipped at the closure of the electric product.

18. The electric product according to claim 17, further comprising a locking device that restricts operation of the closure,
wherein the controller controls the locking device to close the cabinet during performing the main operation mode or the additional operation mode of the electric product.

19. The electric product according to claim 17, wherein the controller controls the driving unit to perform the additional operation mode of the electric product when the closure closes the cabinet at a preset time interval after the main operation mode of the electric product is completed.

20. The electric product according to claim 17, wherein the electric product is a washing machine,
wherein the consumable is clothes, and
wherein the additional operation mode comprises a wrinkle prevention operation mode on laundry.

21. The electric product according to claim 17, wherein the electric product is a drier or a dish washer,
wherein the consumable is clothes or dishes, and
wherein the additional operation mode comprises driving of a fan motor to circulate air in a drying space or a washing space.

22. The electric product according to claim 17, wherein the electric product is a cooking appliance,
wherein the consumable is food, and
wherein the additional operation mode comprises driving of a heating device to maintain a temperature of food.

* * * * *